July 22, 1969   R. B. GREKILA ET AL   3,457,102
METHOD OF COATING WITH GLASS
Filed March 27, 1964
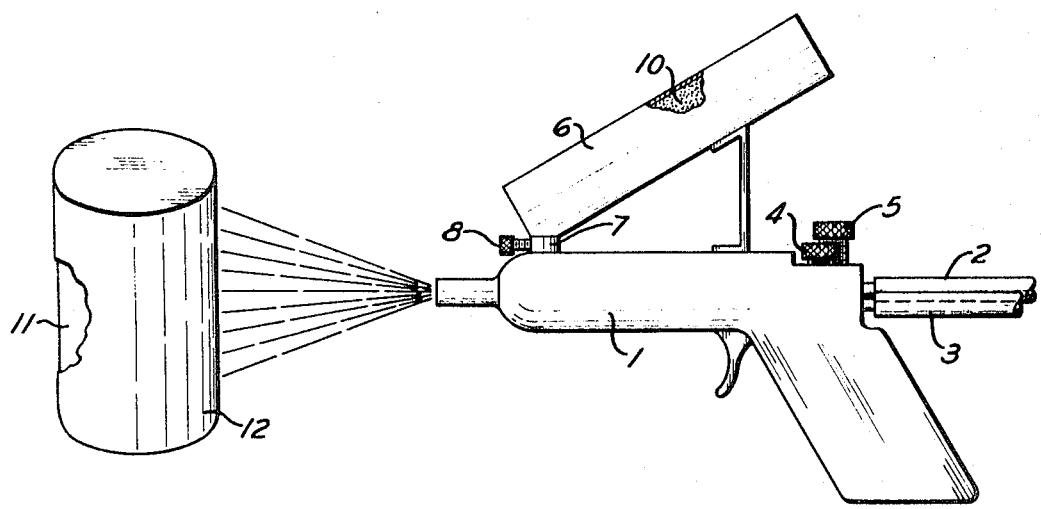
INVENTORS.
RICHARD B. GREKILA
OLIVER S. NEEDHAM, JR.
BY
Frederick Shapoe
ATTORNEY.

United States Patent Office 3,457,102
Patented July 22, 1969

3,457,102
METHOD OF COATING WITH GLASS
Richard B. Grekila, Pittsburgh, Pa., and Oliver S. Needham, Jr., Brook Park, Ohio, assignors to Westinghouse Electric Corporation, Pittsburgh, Pa., a corporation of Pennsylvania
Filed Mar. 27, 1964, Ser. No. 355,381
Int. Cl. B05b 7/20; B05c 9/14; C03c 1/02
U.S. Cl. 117—105.2
6 Claims

ABSTRACT OF THE DISCLOSURE

Members are provided with a continuous glass coating by flame spraying glasses having a melting point of from 400° C. to 1000° C. and of a particle size of between 20 and 65 mesh. The flame sprayed glass coating can be heated to the melting point to produce an impervious layer.

---

This invention relates to the coating of articles with glass, and more particularly to a method in which the glass is sprayed onto the article.

There are many places where it would be desirable to apply a glassy coating to an article if it could be done quickly and inexpensively. A glass coating is superior in many cases to coatings of other materials, especially in the electrical field. Glass coatings may be desired in order to protect or insulate, or merely to provide a decorative appearance. Also, some objects are of such a nature that they will not take the ordinary coatings satisfactorily. In the case of the customary clay-talc-water glass coatings applied to lightning arresters for example, it is necessary to bake the coatings on the arresters and even then they are inferior to glass coatings, which have better electrical and mechanical properties, less chance of breakdown during surge, and more resistance to moisture in storage. In the rocket and missile field there are many cases where a protective high-temperature glass coating would be desirable. One method of forming a glass coating that may come to mind is by flame-spraying powdered glass on the base article, but heretofore the application of glass coatings by flame-spraying has been unsuccessful because after the powdered glass left the spray gun the powder formed itself into glass fibers. In fact, at least one manufacturer of flame-spray guns warns against trying to flame-spray with glass.

It is among the objects of this invention to provide a method of coating articles with glass, in which powdered glass can be flame-sprayed onto the articles, and in which the glass coating can be made impervious.

In the accompanying drawing, there is shown a side view of a flame-spray gun that can be used in carrying out our method.

Forming coatings by flame-spraying with powdered materials other than glass is well known. It is accomplished by feeding a powder of metal, for example, into a jet of burning gases to partly melt the powder and carry it to the article to which it is to be applied. The gases and powdered material can be mixed in a flame-spray gun 1 of well known construction shown in the drawing. One of the suppliers of such a gun is Metco Inc. of Westbury, N.Y. The gun is supplied with oxygen and acetylene through hoses 2 and 3 from pressure tanks (not shown). The two gases are mixed in the gun in the desired proportions by valves 4 and 5, and the mixture emerges from the nozzle at high velocity, where it is ignited to produce a flaming jet. Mounted on top of the gun is a receptacle 6 of any suitable form for powdered material. The receptacle shown is a large inclined cylinder having its lower front end connected by a short tube 7 and valve 8 to the gun passage, through which the inflammable gas mixture flows. The powder in the cylinder therefore feeds into the gas stream and is ejected from the nozzle with it, partly melted by the heat and blown against the article being coated.

When in the past the powdered material placed in receptacle 6 has been glass, all efforts to spray it onto an article to produce a glassy coating failed because glass fibers were formed in the flame issuing from the gun. We have made the discovery that failure can be turned into success, contrary to experts in the flame-spraying art, by using glass particles 10 in a critical range of sizes. That is, a preponderate amount of the particles should pass through a 20 mesh screen and be stopped by a 65 mesh screen, the screens referred to being the U.S. series mesh. When glass particles of such size are fed into the flame-spray from receptacle 6, they become partly molten or heat-softened, but they do not fuse together into fibers. Instead, they remain discrete particles until they strike the article 11 being coated, where they adhere or fuse to one another and the article to cover its surface with a glass coating 12. The velocity of the gases and the temperature of the flame can be adjusted by valves 4 and 5 to produce the best results in each case.

Better results are obtained if the size range of the glass particles is narrower than just mentioned. For example, it is more satisfactory to use particles that will pass 20 mesh and be stopped by 35 mesh, or will pass 35 mesh and be stopped by 48 mesh, or will pass 48 mesh and be stopped by 65 mesh. The last range of sizes has given the best results. Particles that will pass 65 mesh are so small that they tend to be blown out of the flame area, while particles coarser than those that will pass through 20 mesh are likely not to soften sufficiently to fuse together.

Although many different glass compositions can be used in our coating process, one satisfactory glass was a lead alumina borosilicate glass that is inexpensive and has reasonably good electrical resistivity for insulating purposes that was formed from

| | Gm. |
|---|---|
| $SiO_2$ | 20 |
| $Al_2O_3$ | 20 |
| $H_3BO_3$ | 70 |
| $PbO$ | 320 |

These raw materials were placed in a fire clay crucible and fired in a furnace until melted. The glass was then taken from the furnace and allowed to cool to room temperature, after which it was ground into the size ranges referred to above.

In some cases, the glass coating is acceptable just as it is applied, but if it is necessary that the coating be completely impervious it should be heated to its melting point to cause all of the glass particles that form its surface to flow together and close any voids between them. The simplest way to remelt the coating for this purpose is to stop the flow of powdered glass into the flame-spray gun and then play the flame over the coating until its surface has been heated up to the melting point.

In some cases, better results are obtained if the article is preheated before coating. This is especially true of objects that are good heat conductors and would be likely to cool the heat-softened particles so quickly that they would not fuse together or adhere to it. The preheating of the article can be done in a furnace at various temperatures, depending on how hot that particular article needs to be in order to improve adhesion of the particles to it. In practice, the articles have been preheated all the way from 340° F. to 1400° F. just before they were sprayed with the glass particles. The coated article should be cooled slowly to prevent cracking of the coating. When article 11 is a silicon carbide lightning arrester, it was found that a controlled slow rate of heating of the arrester block gave the best results, because rapid heating and the resultant boiling of the water in the sodium silicate binder would deform the block.

Using an oxygen-acetylene flame spraying device, glasses having a softening point of from 400° C. to 1000° C. may be employed in practicing the invention. Thus powdered soda glasses, various flint glasses and borosilicate glasses may be flame sprayed succesfully. If the flame spraying apparatus employs gases whose flame temperature is substantially lower than that of acetylene-oxygen (about 3000° C.), then better results would be obtained using glasses whose softening temperature is substantially less than 1000° C. Thus if the apparatus employs natural gas or hydrogen with air or oxygen, the flame temperature being from about 1800° C. to 2400° C., glasses whose softening points are below 800° C. would be preferred. Also, in some cases, the finer particle sized powders would be preferred with lower flame temperatures. It is understood that in the flame spraying apparatus the combusted gas with the glass particles is projected at a substantial velocity whereby the glass particles with heat softened surfaces impinge with some force on the member being coated. Therefore, devices in which the glass particles are heated and projected by an explosive blast of a gas mixture can be employed with good results.

It will be understood that the invention is directed to the use of glasses which comprise in their entirety amorphous vitreous materials. Also the above description and drawing are only illustrative of the practice of the invention.

We claim:

1. In the method of applying a continuous glass coating upon a member, the steps comprising introducing into a flame comprising combusted gases at a high temperature and having a substantial velocity particles of glass having a softening point of from about 400° C. to 1000° C., the particles being preponderately of a size to pass a 20 mesh screen but retained on a 65 mesh screen, and directing the flame with the entrained glass particles at the member whereby the glass particles with their surfaces in a softened state impinge on the member and adhere thereto and to each other to form a coating of glass thereon.

2. In the method of claim 1 for applying a glass coating upon a member, the steps comprising introducing the glass particles into a flame comprising combusted gases at a high temperature of from 1800° C. to 3000° C.

3. In the method of claim 1 for an impervious glass coating upon a member, the step comprising heating the member with the applied coating of glass to cause the applied glass particles to fuse further to form a substantially imperforate coating.

4. The method of claim 1, wherein the surfaces of the member being coated are preheated to a temperature of from 340° F. to 1400 F.

5. The method of claim 1 wherein the glass particles are substantially in one of the following particle size ranges:
   (a) pass 20 mesh and stopped by 35 mesh
   (b) pass 35 mesh and stopped by 48 mesh, and
   (c) pass 48 mesh and stopped by 65 mesh.

6. The method of claim 1 wherein a protected silicon carbide lightning arrester is produced, comprising preheating the silicon carbide arrester body to a temperature of from 340° F. to 1400° F. to promote improved adhesion of the glass particles thereto, and combustion flame-spraying the preheated silicon carbide arrester body with heat-softened glass particles to form a glass coating, said glass particles being of a glass having a softening point of from 400° C. to 1000° C. and preponderately of a size to pass through a 20 mesh screen and be stopped by a 65 mesh screen, stopping application of said glass particles to the preheated silicon carbide after a continuous coating has been applied, remelting the surface of said coating, and then slowly cooling the coated silicon carbide body.

References Cited

UNITED STATES PATENTS

| 1,617,166 | 2/1927 | Schoop | 117—46 |
| 2,904,449 | 9/1959 | Bradstreet | 117—105.2 X |
| 3,159,348 | 12/1964 | Wedan | 117—46 |
| 3,170,813 | 2/1965 | Duncan et al. | 117—105.2 X |

ALFRED L. LEAVITT, Primary Examiner

J. H. NEWSOME, Assistant Examiner

U.S. Cl. X.R.

117—125